Feb. 10, 1948. S. J. PEREZ 2,435,900
CAM CUTTER
Filed June 2, 1945 2 Sheets-Sheet 1
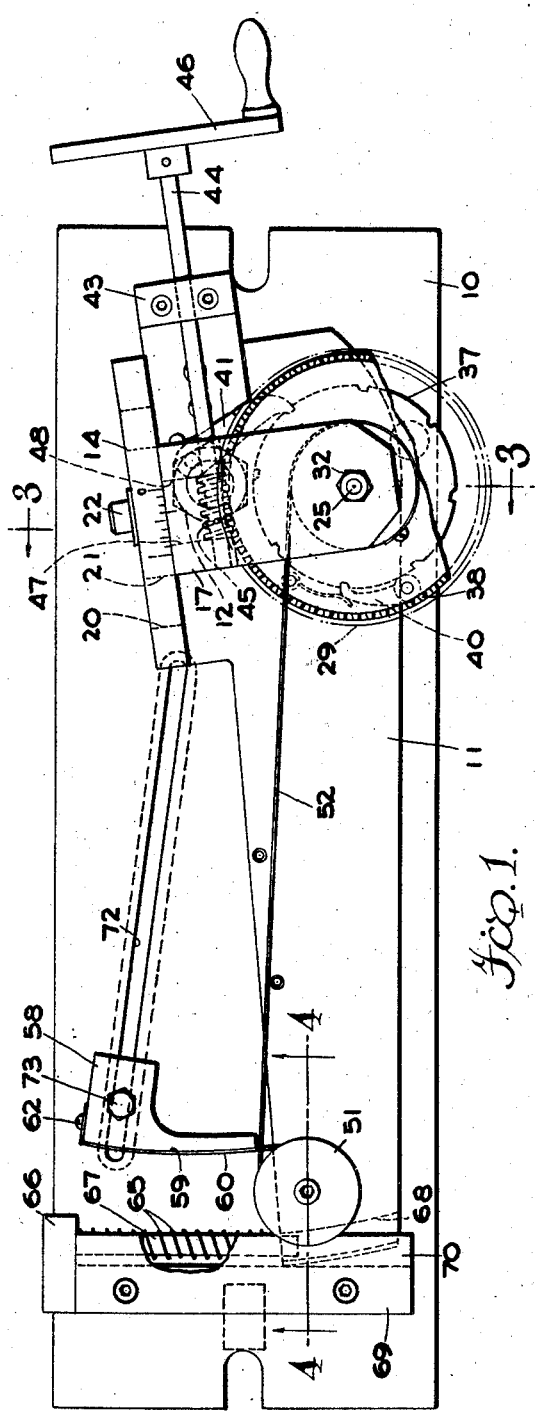
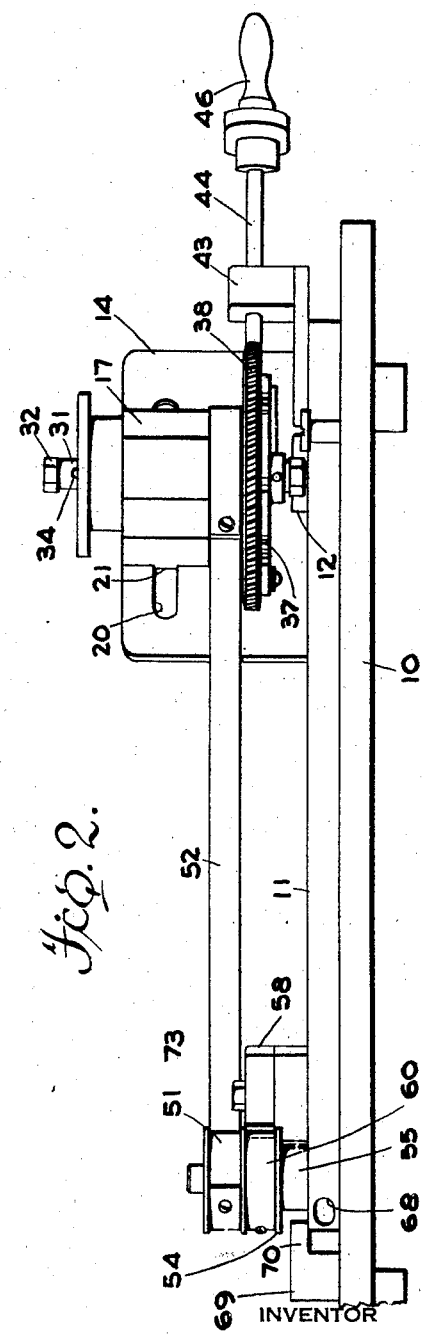
INVENTOR
STEPHEN J. PEREZ
BY
Bean, Brooks, Buckley a Bean. ATTORNEYS Feb. 10, 1948.	S. J. PEREZ	2,435,900
CAM CUTTER
Filed June 2, 1945	2 Sheets-Sheet 2

INVENTOR
STEPHEN J. PEREZ
BY
Bean, Brooks, Buckley & Bean ATTORNEYS

Patented Feb. 10, 1948

2,435,900

UNITED STATES PATENT OFFICE 2,435,900

CAM CUTTER

Stephen J. Perez, Rochester, N. Y., assignor of one-half to Joseph M. Murray, Rochester, N. Y.

Application June 2, 1945, Serial No. 597,355

5 Claims. (Cl. 90—13.9)

This invention relates to profile or contour cutting machinery and particularly to means for controlling the relative disposition of a work piece and a tool during a machining operation.

The principles of the present invention are not limited to the particular application illustrated and described in detail in the following specification. The particular example shown herein is by way of example. Further, while the apparatus shown and described is in the form of a demountable fixture which may be secured to the work table of a milling machine, drill press, or other machine tool, it is intended that a complete and unitary machine tool embodying the work holding principles here set forth may be constructed to include the principles of the present invention without the feature of demountability.

Referring to the particular application set forth by way of example, the object is to cut a rotatable cam which is to act upon a follower carried by an oscillating arm having a relatively fixed axis of oscillation. In this particular instance, it is desired that the oscillating arm have a highly precise and constant angular movement for each increment of angular movement of the cam about its own axis of rotation. To this end it is necessary to correct for the error which normally is introduced by reason of the fact that the point of contact or tangency of the cam follower with the cam periphery is not fixed or constant and varies with variations in the angular position of the cam follower arm. Another factor of error is due to the harmonic rate of rise ordinarily resulting when a cam follower is carried by a pivoted arm and thus moves through a fixed arc.

When the principles of the present invention are pursued these two factors of error are avoided and corrective account is also taken of the fact that the relationship of the axis of the cam and the axis of the cam follower is modified by the fact that the engaging surface of the cam follower is arcuate. In other words, allowance is made for the diameter of the cam follower roller. The latter may be accomplished by merely using a rotating cutter of the same radius as the cam follower to be used.

To adapt the apparatus readily to conventional machine tool construction, it is more efficient to regard the cutter, which occupies the position of the cam follower in generating the cam, as having a fixed axis. I then proceed to revolve the cam blank along an arc of the same radius as the center to center length of the cam follower supporting arm. This revolution is controlled to occur in predetermined ratio with respect to rotation of the cam blank on its own axis as generation of the cam profile thereof progresses. While specific reference is had herein to milling or other cutters, the principles are applicable to grinding or other finishing or surfacing processes.

While various mechanical modifications of the principles of my invention may be made, a single complete embodiment is described in detail and shown in the accompanying drawings, by way of example. However, the scope of my invention is not to be considered limited in any way excepting as defined in the appended claims.

In the drawings:

Fig. 1 is a plan view of work supporting and securing means adapted to be secured to the work holding element or at the work station of a machine tool;

Fig. 2 is a side elevational view thereof;

Throughout the several figures of the drawings, like characters of reference denote like parts and the numeral 10 designates a main base plate for securement to a milling machine, drill press, grinder, or other machine tool work table in any desired conventional manner.

Figure 3:
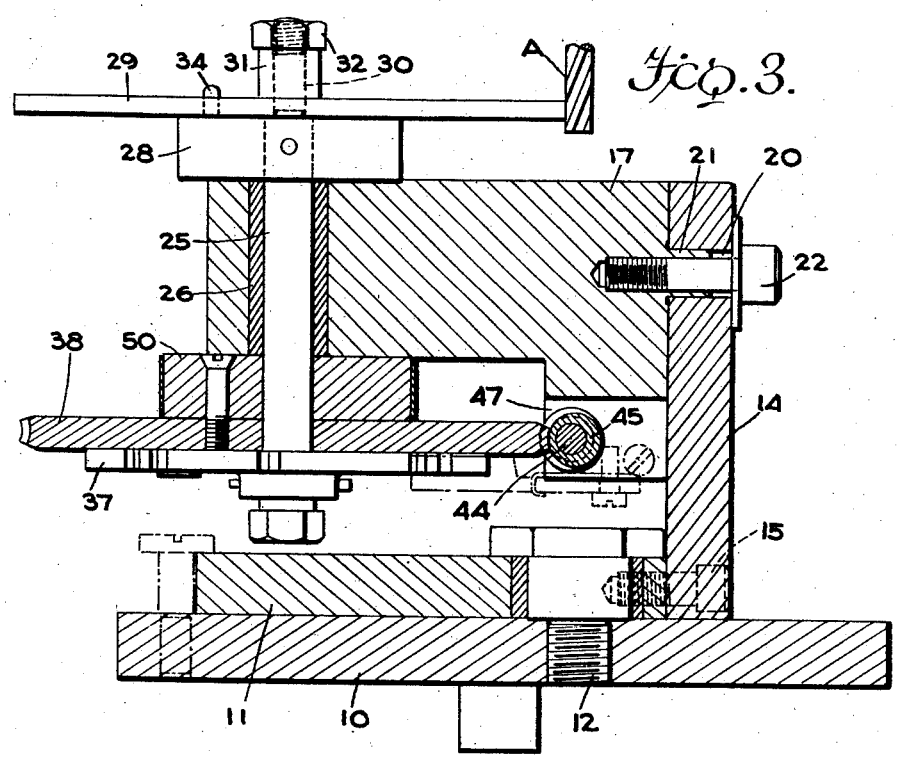
Fig. 3 is a transverse cross-sectional view approximately on line 3—3 of Fig. 1.

The base 10 has pivotally secured thereto a longitudinal arm 11 and, as appears best in Fig. 3, a headed pin 12 screws into the base 10 to establish a fixed pivot axis for arm 11. Adjacent to the pivoted end of arm 11 a vertical plate 14 is fixed to an edge thereof as by screws 15, and the plate 14 supports a block 17 which extends over arm 11 but vertically spaced therefrom. Plate 14 has a longitudinal groove 20 and block 17 is provided with a tongue 21 for engagement therein. A screw 22 serves to lock the block 17 in any desired adjusted longitudinal position along the plate 14. In the form shown, the upper edge of plate 14 is graduated as shown in Fig. 1 and the manner in which the setting of block 17 controls the resultant product will presently appear.

The block 17 is provided with a vertical work holding spindle 25 which, as shown in Fig. 3, may rotate in a bushing 26. At its upper end spindle 25 has fixed thereto a collar 28 which receives and supports a cam blank 29. In Fig. 1 the collar 28 has been removed for clearness. An upper threaded extension 30 of spindle 25 receives a collar 31 and a nut 32 which co-operate to releasably clamp the cam blank to collar 28. To insure against relative rotation between the cam blank and spindle 25 the collar 26 may be fitted with an upwardly projecting dowel pin 34 and the cam blanks will then be provided with registering openings to receive the dowel pin 34.

The relative position of the axis of spindle 25 and pivot pin 12, as viewed in plan, duplicates the relative positions of the cam axis and the axis of oscillation of the follower roller supporting arm with which the cam is to be used. As viewed in Fig. 3, the spacing of the axis of spindle 25 and the axis of pivot pin 12 equals the radius of the cam blank at the particular moment of contact plus the radius of the cam roller. As viewed at right angles to Fig. 3 the spacing of the two axes referred to is equal to the center to center length of the cam roller arm. This distance is adjustable in the form illustrated, and in Fig. 3 is shown set for a roller arm which oscillates the roller along an arc of ⅜ of an inch radius. In Fig. 3 a cutter rotatable about a relatively fixed vertical axis is designated A.

The lower portion of the spindle 25 has fixed thereto a ratchet wheel 37, and a worm wheel 38 has free rotation upon spindle 25. The worm wheel 38 has pivoted thereto a pawl 40 for engagement with ratchet wheel 37 and a locking pawl 41 is pivoted to the underside of block 17, also for engagement with ratchet wheel 37. A bracket 43 secured to the upper surface of arm 11 rotatably supports a shaft 44, which has fixed thereto a worm 45 and an operating handle 46. Further bearing support for the worm shaft 43 may be provided at opposite sides of worm 45 by means of bearing blocks 47 and 48 secured to the under side of block 17.

Manual rotation of handle 46 in a clockwise direction as viewed from the right in Fig. 1 produces clockwise rotation of worm wheel 38, as viewed in plan; and, through co-operation of pawl 40 and ratchet wheel 37, the cam blank 29 is thus rotated. During such rotation the relative center to center distance of the cam blank and the rotating cutter is precisely and progressively adjusted in such a way that the ultimate angular movement of a cam follower arm and the angular movement of the cam will represent a straight line function. This is accomplished by imparting controlled oscillation to longitudinal arm 11 during and incident to rotation of the cam blank.

Figure 4:
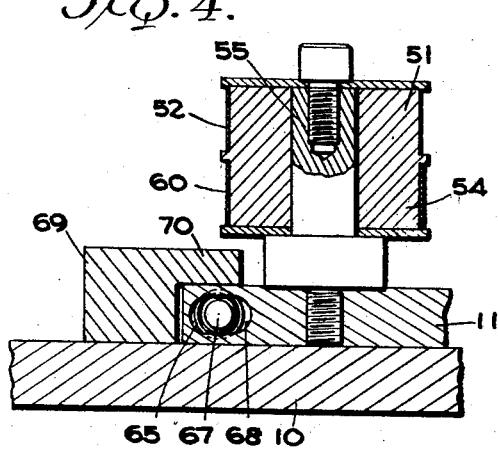
Fig. 4 is a fragmentary cross-sectional view on line 4—4 of Fig. 1.

To this end the spindle 25 rotatably supports a drum 50 which is fixed to worm wheel 38 as by means of a screw, see Fig. 5. Arm 11 supports a companion drum 51 for free rotation. A flexible tape or band 52 is wound partially about each of the drums 50 and 51 and a third drum 54 is fixed co-axially with drum 51. As shown in Fig. 4, the drums 51 and 54 may be integrally formed and rotatably mounted upon a pivot pin 55 screwed into arm 11. A block 58 is removably fixed to the base 10 and has an arcuate vertical face 59, which is of the same radius as the distance from pivot pin 12 to a point of tangency with the periphery of drum 54, minus the thickness of a tape or band 60 which extends about drum 54 and is fixed to block 58 at its other end as indicated at 62 in Fig. 1.

A compression coil spring 65 has one of its ends anchored to a block 66 fixed to base 10 and its other end engages against the outer end of longitudinal arm 11 to urge the latter in a counter-clockwise direction about the pivot pin 12. A spring guide pin 67 extends from block 66 to and into an opening 68 formed in arm 11. A guide block 69 secured to base 10 has an overhanging ledge portion 70 which encloses the spring means and serves as a hold down for the outer end of arm 11.

When the cam blank is moved in a clockwise direction by manipulation of handle 46, drum 50, which rotates therewith through its connection with worm wheel 38, acts through band or tape 52 to give equal clockwise rotation to drums 51 and 54. The band 60 thus winds upon drum 54 and moves the center of drums 51 and 54 upwardly as viewed in Fig. 1 along an arc struck from the axis of pivot pin 12. This movement exactly reproduces the relative changing movements and center distances of the cam blank and the cam follower and the resultant cam profile is accordingly exactly formed to impart constant angular movement to the cam follower of the supporting arm for each increment of angular movement of the resultant cam.

Assuming, for example, that eight duplicate rises are to be formed on a cam blank, the operator will rotate handle 46 until locking pawl 41 drops into the next recess in ratchet wheel 37. The operator then reverses the rotation of handle 46 which produces free reverse rotation of worm wheel 38 and drum 50 until pawl 40 picks up another tooth of ratchet wheel 37 whereupon the next successive cam rise may be formed. Note that the reverse rotation of worm wheel 38 with drum 50 relocates the cam blank axis to begin another rise formation without rotation of the cam blank on its own axis.

The distance from the center of pivot pin 12 to arcuate surface 59 determines the height of the rise formed on the cam, other things being equal. The block 58 is held in a slot 72 in base 10 by a bolt 73. Other blocks may be substituted at different radii from pivot pin 12 and the drums 51 and 54 may be relocated to produce cams of other rise dimensions.

What is claimed is:

1. Apparatus for generating the profile of a cam adapted to act upon an arcuately movable follower and move it at a relatively constant angular rate, said apparatus comprising a rotating forming tool having a relatively fixed axis, a work holding element supported for pivotal movement about an axis parallel to the tool axis and spaced therefrom a distance equal to the desired radius of movement of the cam follower, a work holding spindle journaled in said work holding element with its axis parallel to the pivot axis of the work holding element and spaced therefrom the same distance as the desired spacing of the cam axis and the axis of arcuate movement of the follower, and drive means between said work holding element and said spindle whereby their relative angular rates of rotation are constant during generation of the cam profile.

2. A work holding fixture for co-operation with a rotating forming tool having a relatively fixed axis, said fixture comprising a base and a work holding element pivoted thereto on an axis parallel to the axis of the forming tool, a work holding spindle carried by said work holding element with its axis parallel to said fixed axis and said pivot axis and means for rotating said spindle to rotate a work piece in engagement with said forming tool, and drive means connecting said spindle and said work holding element whereby the latter is rotated about its pivotal connection with the base at a constant relative angular rate of rotation with respect to the rate of rotation of said spindle during a forming operation.

3. Apparatus for generating the profile of a cam adapted to act upon an arcuately movable follower and move it at a relatively constant angular rate, said apparatus comprising a rotating forming tool element and a work holding element, one of said elements being supported for pivotal movement about an axis parallel to the axis of rotation of the forming tool and spaced therefrom a distance equal to the desired radius of the arcuate path of the cam follower, a work holding spindle journaled in said work holding element with its axis parallel to the pivot axis of the one of said elements and spaced therefrom the same distance as the desired spacing of the cam axis and the axis of arcuate movement of the follower, and drive means between the one of said elements and said spindle whereby their relative angular rates of rotation are constant during generation of the cam profile.

4. Apparatus for generating a profile on a work piece comprising a rotating forming tool element and a work holding element, one of said elements being supported for pivotal movement about an axis parallel to the axis of rotation of the forming tool and spaced therefrom a predetermined distance, a work holding spindle journaled in said work holding element with its axis parallel to the pivot axis of the one of said elements and spaced therefrom, and drive means between the one of said elements and said spindle whereby their relative angular rates of rotation are constant during generation of the profile of the workpiece.

5. Apparatus for generating the profile of a work piece comprising a rotating forming tool element and a work holding element, one of said elements being supported for pivotal movement about an axis parallel to the tool axis, a work holding spindle journaled in said work holding element with its axis parallel to the pivot axis of the one of said elements and spaced therefrom, rotary drive means coaxially fixed with respect to the one of said elements and rotary drive means coaxial and engageable with said spindle, and transmission means between said two drive means whereby the relative angular rates of rotation of the one of said elements and said spindle are constant during generation of the profile of the workpiece.

STEPHEN J. PEREZ.

REFERENCES CITED

The following references are of record in the file of this patent:

UNITED STATES PATENTS

| Number | Name | Date |
| --- | --- | --- |
| 935,345 | Wiebke | Sept. 28, 1909 |
| 1,003,816 | Scoville | Sept. 19, 1911 |
| 1,575,713 | Olson | Mar. 9, 1926 |
| 1,651,432 | Bath | Dec. 6, 1927 |
| 1,689,370 | Tessky | Oct. 30, 1928 |
| 1,704,833 | Irwin | Mar. 12, 1929 |
| 2,116,686 | Odom | May 10, 1938 |
| 2,144,771 | Mossdorf | Jan. 24, 1939 |
| 2,386,973 | Mieth | Oct. 16, 1945 |

FOREIGN PATENTS

| Number | Country | Date |
| --- | --- | --- |
| 434,154 | Germany | Sept. 22, 1926 |
| 579,272 | Germany | June 22, 1933 |